United States Patent
Banyard et al.

(10) Patent No.: US 10,834,234 B2
(45) Date of Patent: *Nov. 10, 2020

(54) AUTOMATIC INTERDEPENDENCY RESOLUTION FOR MICRO-SERVICE DEPLOYMENTS

(71) Applicant: International Business Machines Corporation, Armonk, NY (US)

(72) Inventors: Nicholas S. Banyard, London (GB); Amardeep S. Kalsi, London (GB); Konrad Ohms, Boeblingen (DE); Thomas Spatzier, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/430,594

(22) Filed: Jun. 4, 2019

(65) Prior Publication Data
US 2019/0289097 A1 Sep. 19, 2019

Related U.S. Application Data

(63) Continuation of application No. 15/461,639, filed on Mar. 17, 2017, now Pat. No. 10,356,213.

(51) Int. Cl.
*H04L 29/08* (2006.01)

(52) U.S. Cl.
CPC .............. *H04L 67/34* (2013.01); *H04L 67/36* (2013.01)

(58) Field of Classification Search
CPC .................................. H04L 67/34; H04L 67/36
See application file for complete search history.

(56) References Cited

U.S. PATENT DOCUMENTS 10,013,550 B1 * 7/2018 Ahuja ................ H04L 67/1008
2016/0124742 A1 5/2016 Rangasamy et al.
(Continued)

FOREIGN PATENT DOCUMENTS

CN 105162884 A 12/2015

OTHER PUBLICATIONS

"Continuous Integration and Delivery of Microservices using Jenkins CI, Maven, and Docker Compose", https://programmaticponderings.com/2015/06/22/continuous-integration . . . , Jun. 22, 2015, 18 pages.

(Continued)

*Primary Examiner* — Arvin Eskandarnia
(74) *Attorney, Agent, or Firm* — William H. Hartwell; Maxine L. Barasch; Keohane & D'Alessandro, PLLC

(57) ABSTRACT

Disclosed embodiments provide techniques for automatic interdependency resolution for micro-service deployments. A micro-service deployment broker executing on a computing device obtains current environment and feature support of a deployed distributed computing environment. The micro-service deployment broker determines environment and feature requirements for a requested deployment, and compares that with the current environment and feature support of the deployed distributed computing environment. Based on the comparison, a deployment command is issued indicating the deployment plan for the requested deployment. In cases where deployment is not possible or only a partial deployment is possible, an indication is sent to an operator to indicate that full deployment did not occur.

20 Claims, 8 Drawing Sheets

(56) References Cited

U.S. PATENT DOCUMENTS

2018/0198845 A1* 7/2018 Kulp .................. H04L 67/10
2018/0270327 A1   9/2018 Banyard et al.

OTHER PUBLICATIONS

Balalaie et al., "Microservices Architecture Enables DevOps: an Experience Report on Migration to a Cloud-Native Architecture", IEEE Software, Jan. 2016, 12 pages.
Eskandarnia, Arvin, U.S. Appl. No. 15/461,639, Notice of Allowance and Fees Due, dated Mar. 5, 2019, 13 pgs.
Appendix P, "List of IBM Patents or Patent Applications Treated as Related", Apr. 1, 2020, 2 pages.

* cited by examiner

| Feature | Component |
|---|---|
| OPENSSL_SOCKET | curl |
| TWOFISH_CTR_CIPHER | dropbear |
| REVERSE_WMV_PLAYBACK | gstreamer |

FIG. 4

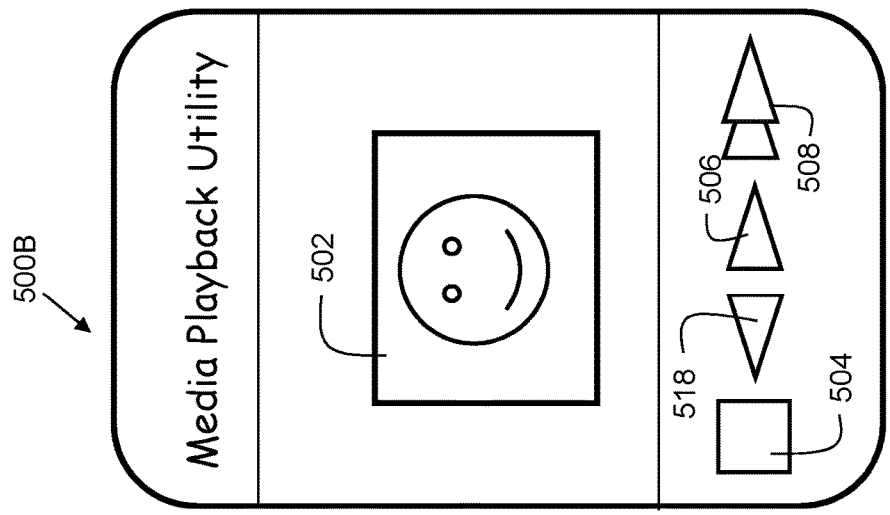
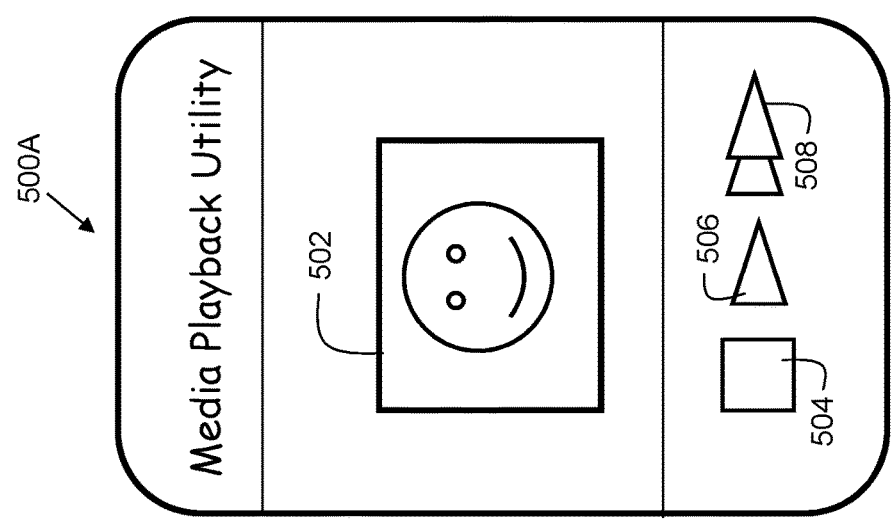
FIG. 5

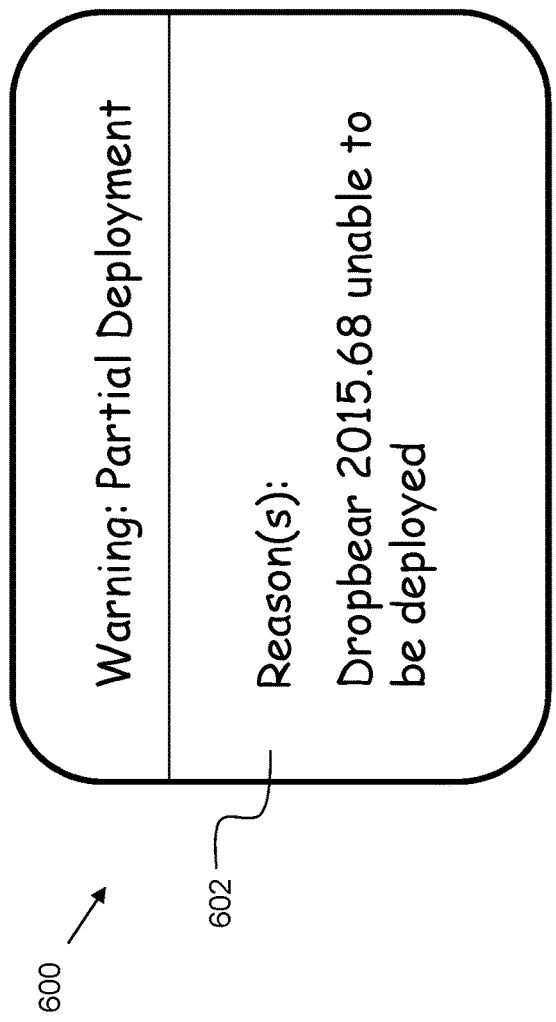
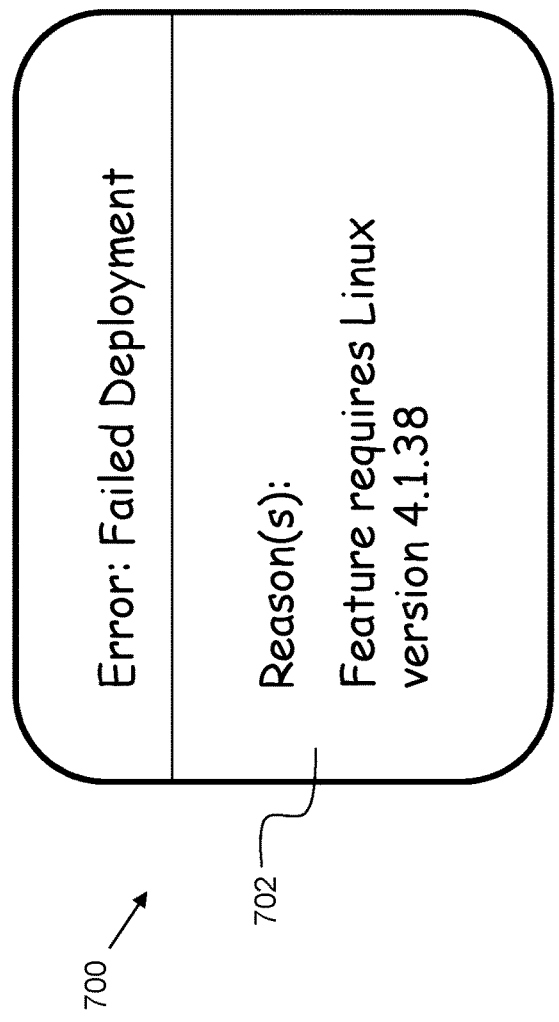
FIG. 6
FIG. 7

```
services.json: {
    "name": "serviceA",
    "features": [
        {"name": "namedFeatureA", "properties": {}},
        {"name": "namedFeatureB", "properties": {}}
    ],
    "serviceDependencies": [
        {"name": "namedFeatureC", "service": "serviceB", "properties": {}}
    ],
    "envDependencies": [
        {"envType": "cf", "dependencyType": "ups", "name": "myUserProvidedService", "properties": {}},
        {"envType": "cf", "dependencyType": "cfservice", "name": "myDataCache", "properties": {}},
        {"envType": "docker", "dependencyType": "cfservice", "name": "myContainer", "properties": {}}
    ]
}
```

FIG. 8

```
environment.json
{
  "name": "dockerHost1",
  "type": "docker",
  "properties": {
  "containers": [
    {
      "name": "myContainer",
      "exposedPorts": [80, 443],
      "ip": 9.9.9.9
    }
  ]
  }
}
```

FIG. 9

AUTOMATIC INTERDEPENDENCY RESOLUTION FOR MICRO-SERVICE DEPLOYMENTS

The present patent document is a continuation of U.S. patent application Ser. No. 15/461,639, filed Mar. 17, 2017, entitled "AUTOMATIC INTERDEPENDENCY RESOLUTION FOR MICRO-SERVICE", the entire contents of which are incorporated herein by reference.

FIELD OF THE INVENTION

The present invention relates generally to computer applications, namely automatic interdependency resolution for micro-service deployments.

BACKGROUND

A micro-service architecture is a technique for developing software systems that has grown in popularity in recent years. The micro-service architecture provides good scalability, which makes it well-suited for enabling support for a range of platforms and devices, including mobile, Internet of Things, and wearables, to name a few. Thus, the micro-service architecture enables developing software applications as a suite of independently deployable, small, modular services in which each service runs a unique process and communicates through a well-defined, lightweight mechanism to serve a business goal. As the micro-service architecture continues to gain in popularity, there is a need for improvement in the deployment of features in such an environment.

SUMMARY

In one aspect, there is provided a computer-implemented method for managing micro-service deployment in a computing environment, comprising: receiving a deployment request; performing an environment query of the computing environment; performing a feature query of the computing environment; identifying required features for the deployment request; identifying a required environment for the deployment request; generating a deployment command based on the environment query, feature query, identified required features, and identified required environment; and issuing the deployment command to a cross-team continuous integration server.

In another aspect, there is provided an electronic device comprising: a processor; and a memory coupled to the processor, the memory containing instructions, that when executed by the processor, perform the steps of: receiving a deployment request; performing an environment query of a computing environment; performing a feature query of the computing environment; identifying required features for the deployment request; identifying a required environment for the deployment request; generating a deployment command based on the environment query, feature query, identified required features, and identified required environment; and issuing the deployment command to a cross-team continuous integration server.

In yet another aspect, there is provided a computer program product for managing micro-service deployment in a computing environment, the computer program product configured to execute on an electronic computing device, the electronic computing device comprising a computer readable storage medium having program instructions embodied therewith, the program instructions executable by a processor to cause the electronic computing device to: receive a deployment request; perform an environment query of a computing environment; perform a feature query of the computing environment; identify required features for the deployment request; identify a required environment for the deployment request; generate a deployment command based on the environment query, feature query, identified required features, and identified required environment; and issue the deployment command to a cross-team continuous integration server.

BRIEF DESCRIPTION OF THE DRAWINGS

Features of the disclosed embodiments will be more readily understood from the following detailed description of the various aspects of the invention taken in conjunction with the accompanying drawings.

FIG. 4 shows an example of a data structure in accordance with embodiments of the present invention.

FIG. 5 shows an example user interface pre- and post-feature deployment.

FIG. 6 shows an example warning message indicating a partial deployment.

FIG. 7 shows an example error message indicating a failed deployment.

FIG. 8 shows an example services JSON file.

FIG. 9 shows an example environment JSON file.

Figure 1:
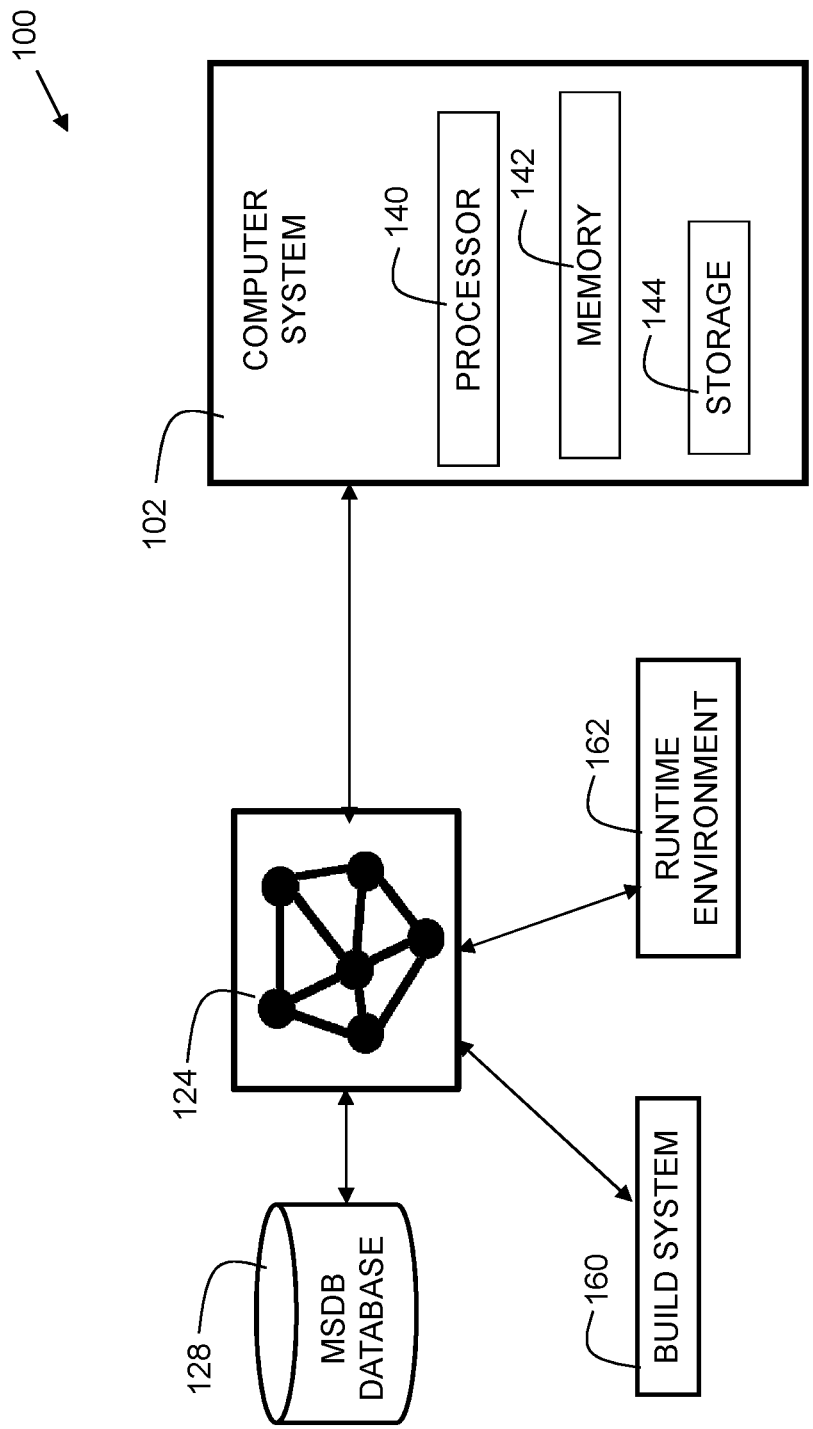
FIG. 1 shows a system in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for automatic interdependency resolution for micro-service deployments. A micro-service deployment broker executing on a computing device obtains current environment and feature support of a deployed distributed computing environment. The micro-service deployment broker determines environment and feature requirements for a requested deployment, and compares that with the current environment and feature support of the deployed distributed computing environment. Based on the comparison, a deployment command is issued indicating the deployment plan for the requested deployment. In cases where deployment is not possible or only a partial deployment is possible, an indication is sent to an operator to indicate that full deployment did not occur. In this way, the complexities of upgrading applications/services in a deployed distributed computing environment are greatly simplified.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 shows an environment 100 for implementation of embodiments of the present invention. A computer system 102 includes a processor 140, memory 142, and storage 144. Memory 142 includes instructions for executing steps in accordance with embodiments of the present invention. Computer system 102 is an electronic computing device in communication with a network 124. Network 124 may be the Internet, a wide area network, a local area network, a cloud computing network, an intra-enterprise network, or any other suitable network. Also in communication with the network is MSDB database 128, build system 160, and runtime environment 162. MSDB database 128 stores data including requirements for programs and credentials, such as passwords or keys for access to components. Build system 160 is used by developers to develop code for programs, and runtime environment 162 is used to host the developed code/programs. This is an example configuration of the environment. In some embodiments, more components may be included in the environment.

Figure 2:
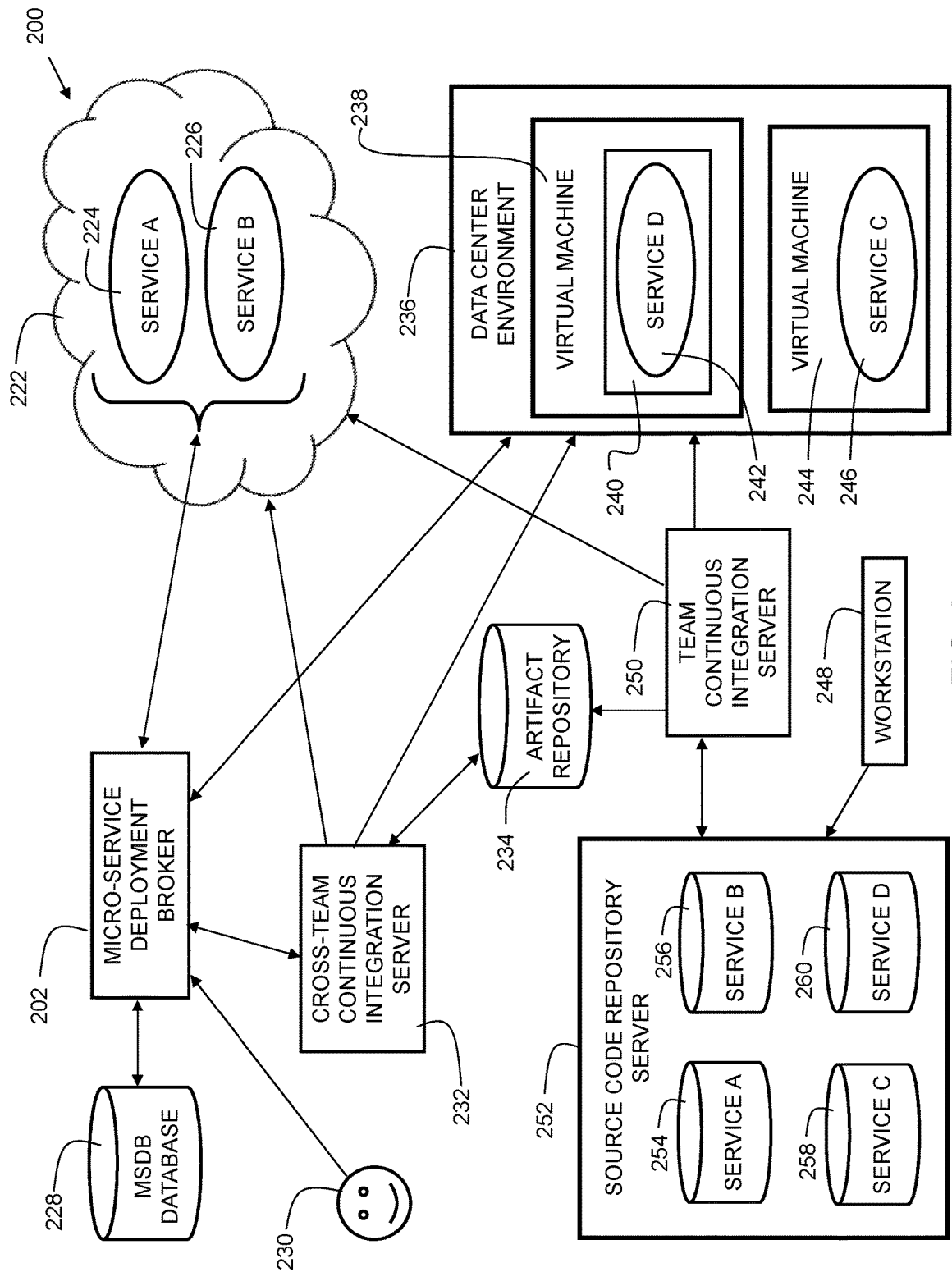
FIG. 2 shows additional details of interaction with a micro-service deployment broker in accordance with embodiments of the present invention.

FIG. 2 shows a system 200 including additional details of interaction with a micro-service deployment broker in accordance with embodiments of the present invention. Micro-service deployment broker (MSDB) 202 issues commands to the cross-team continuous integration server 232 to deploy code. In embodiments, MSDB 202 may be executing on a computer system such as 102 of FIG. 1. Operator 230 is shown in communication with MSDB 202. The operator is in charge of deploying the new features to the cloud platform. The operator can register and update environments to the MSDB 202. The operator gives instructions to the MSDB 202 to determine whether a new feature can be deployed and, if so, how it can be deployed. A deployment command is generated based on an environment query, feature query, identified required features, and identified required environment. The deployment command is issued to cross-team continuous integration server 232.

Four services are shown in the example. Service A 224 and Service B 226 are deployed in a cloud network 222. The cloud network 222 may support a Platform-as-a-Service environment. The cloud network 222 may register info uniform resource locators (URLs) on startup with the MSDB 202. The MSDB 202 may use the registered URLs with a RESTful API such as an HTTP GET to retrieve information about available features provided by each component (micro-service).

Service C 246 and Service D 242 are deployed onto virtual machine 244 and virtual machine 238, respectively. Service D 242 is executing within a container 240. Containerization can provide additional flexibility and performance in certain circumstances. Containers sit on top of a physical server and its host operating system (OS) (e.g. Linux). Unlike a virtual machine, where a guest OS is used, in containerization, each container shares the host OS kernel and, typically, the binaries and libraries, too. This makes containers exceptionally "light"—containers are only megabytes in size and take just seconds to start, versus minutes for a virtual machine (VM).

Virtual machines 244 and 238 are deployed on data center 236. The virtual machines may register info URLs on startup with the MSDB. The MSDB 202 may use the registered URLs with a RESTful API such as an HTTP GET to retrieve information about available features.

Cross-team continuous integration server 232 is in communication with cloud network 222 and data center 236. A software developer uses workstation 248 to deliver code to the source code repository server 252. The source code repository server may utilize a version control system such as git, svn, cvs, or other suitable version control system. When the workstation 248 commits the source code to source code repository server 252, the server 252 may inform team continuous integration server 250 to trigger a build, automated testing, and/or other actions. Upon successful building and testing, the built artifacts are stored in the artifact repository 234. Thus, as features are developed, the components that support those features are sent to the artifact repository 234.

Team continuous integration server 250 is in communication with data center 236, cloud network 222, and source code repository server 252. The server 252 includes four source code repositories including Service A repository 254, Service B repository 256, Service C repository 258, and Service D repository 260.

In embodiments, the team continuous integration server 250 and/or the cross-team continuous integration server 232 may be implemented as Jenkins servers. For the cross-team continuous integration server 232, it is configured to receive commands from the MSDB 202 to perform a deployment operation. The MSDB 202 greatly simplifies the task of deploying a feature that relies on multiple components distributed across multiple platforms/machines. The MSDB 202 can determine the prerequisite features and/or environment requirements for the feature that is to be deployed. In embodiments, one or more JSON files can be used to indicate the prerequisites. JSON (JavaScript Object Notation) is a lightweight data-interchange format. It is easy for humans to read and write, while also being easy for machines to parse and generate. It is based on a subset of the JavaScript Programming Language.

The MSDB 202 can initiate queries to the currently deployed applications to determine currently supported features. In some embodiments, each currently deployed component implements an API that allows the MSDB 202 to query the component for currently supported features. In some instances, feature information, environment information, hardware information, and other pertinent information may be stored in the MSDB database 228. Thus, the MSDB 202 can be configured to retrieve current feature availability from APIs where possible, and use static information in the MSDB database 228 as a fallback, or for features that do not support a feature availability API. In some embodiments, each micro-service and each environment provides a JSON file describing its capabilities. In some embodiments, the cross-team continuous integration server 232 sends services.json files as an array to the MSDB 202. The MSDB 202, in response, provides a deployment command to the cross-team continuous integration server 232.

Figure 3:
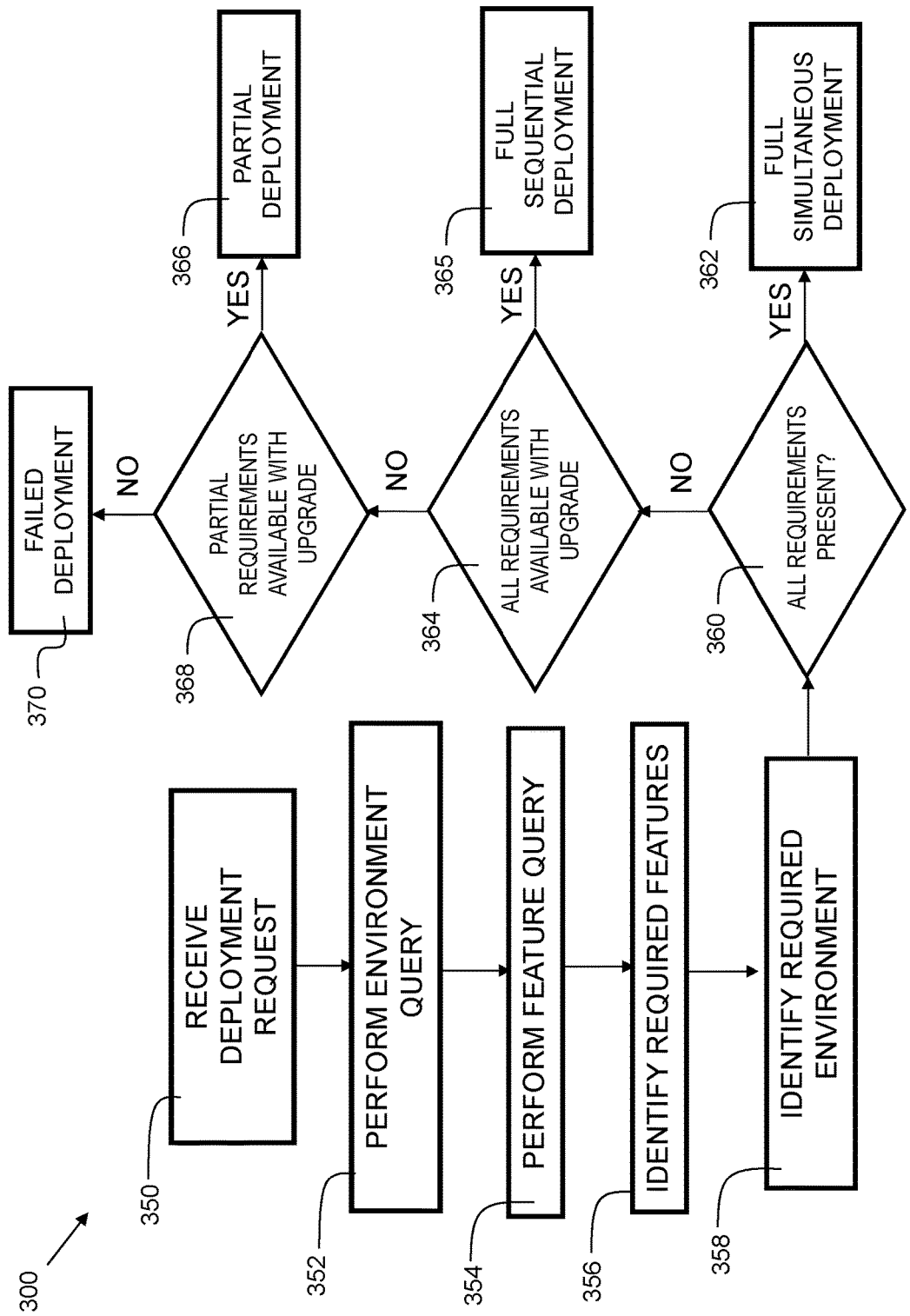
FIG. 3 shows a flowchart in accordance with embodiments of the present invention.

FIG. 3 shows a flowchart 300 in accordance with embodiments of the present invention. At 350, a deployment request is received. The deployment request can be for a new feature, and can also include required prerequisite features and/or environment requirements. In embodiments, the required prerequisite features and environment requirements may be communicated using one or more JSON files.

At 352, an environment query is performed. For example, a check is made to determine whether the correct operating system is installed on a host server. At 354, a feature query is performed. A determination is made as to which of the required features are currently available. In embodiments, each micro-service implements an info Application Programming Interface (API) and defines a service.json file in its deliverable, describing requirements regarding environment, other services, and its own features available after deployment. A continuous integration server can retrieve a services.json file from a code repository and sends them to the MSDB 202 which evaluates if deployment is possible. This could be triggered by new source code events, such as a delivery of source code to the source code repository server (252 of FIG. 2).

At 356, required features are identified. In embodiments, this may be obtained from a services.json file associated with the feature to be deployed. At 358, a required environment is identified. In embodiments, this may be obtained from an environment.json file associated with the feature to be deployed. At 360, it is determined whether all requirements are present. If yes, a full simultaneous deployment is executed, at 362. This means that all requirements and environmental conditions are currently satisfied, and any new component versions can be deployed simultaneously to implement the new deployment. In this case, the MSDB 202 identifies that environment requirements and service dependencies are met via a combination of HTTP GET calls and/or queries to the MSDB database 228, and sends a response to the cross-team continuous integration server 232 indicating that deployment can be started in parallel. Thus, in embodiments, the deployment command includes a full simultaneous deployment command.

If the result at 360 is no, then at 364, it is determined whether all requirements are available with an upgrade. If yes, at 365, a full sequential deployment is executed. This means that if the components are upgraded in the right order, then it is possible to deploy the feature. For example, if the deployed feature requires upgrade of two components (micro-services), referred to as component A and component B, and component A requires a feature that is only available when component B is upgraded, then the MSDB 202 can instruct the cross-team continuous integration server 232 to perform a sequential deployment, deploying the upgraded component B first, followed by component A. In this way, a full deployment is possible, although it takes more time than does a simultaneous deployment. In this case, the MSDB 202 identifies that environment dependencies are fulfilled, but that service dependencies cannot be fulfilled by the current deployed set of components (services). The MSDB 202 can analyze if the service dependencies can be resolved by deploying some service upgrades prior to deploying the desired feature. If this is possible, the MSDB 202 sends a response to the cross-team continuous integration server 232 indicating that deployment can be started sequentially in a given order. Thus, in embodiments, the deployment command includes a full sequential deployment command.

If the result at 364 is no, then it is determined whether partial requirements are available with an upgrade, at 368. If yes, then a partial deployment is executed at 366. In such a scenario, the deployment may be flagged as incomplete or unstable, since not all required features could be provided. In this scenario, the MSDB 202 identifies that environment dependencies are fulfilled, but service dependencies cannot be fulfilled by the currently deployed suite of services. If, analysis of the services.json array cannot determine an order in which all dependencies can be resolved, then a check is made if a subset of services can be deployed. The MSDB 202 sends a response to the cross-team continuous integration server 232 indicating that a subset of services can be started in a given order. In this case, an alert may be sent to an operator and/or deployment engineer to notify them of the situation. Thus, in embodiments, the deployment command includes a partial deployment command.

If the result at 368 is no, then the deployment fails at 370, indicating that the deployment could not proceed due to environment dependencies that are not fulfilled. In some cases, a subset of services may be deployed, but the desired feature likely will be non-functional since the environment requirements are not being met. Thus, in embodiments, the deployment command includes a failed deployment command. In this case, an alert may be sent to an operator and/or deployment engineer to notify them of the situation.

FIG. 4 shows an example of a data structure in accordance with embodiments of the present invention. The data structure contains a list of required prerequisite features, and the corresponding component that can provide that feature. In the example, the data structure 1000 has two columns. Column 1002 shows the feature and column 1004 shows the component to which the feature corresponds. For example, the feature of OPENSSL_SOCKET is provided by the component curl, the feature of TWOFISH_CTR_CIPHER is provided by the component dropbear, and the feature of REVERSE_WMV_PLAYBACK is provided by the component gstreamer. These features and components are merely exemplary, and in practice, other features and components may be prerequisites for deployment of a new feature. Thus, if a new feature to be deployed requires OPENSSL_SOCKET, TWOFISH_CTR_CIPHER, and REVERSE_WMV_PLAYBACK, then prior to deployment, the MSDB 202 queries the respective components to determine if the feature is currently available in the deployed version. In embodiments, each component may implement an API such as a RESTful API to indicate what features are provided. In this way, the MSDB 202 can determine what features are currently available just before deployment. This is important because features can sometimes be removed from newer versions of a component. That is, just because a component provided a feature at one point in time does not mean that the feature will always be available. Thus, querying the various components just before deployment ensures the most up-to-date list of available features is used in determining the appropriate deployment command.

FIG. 5 shows an example user interface pre- and post-feature deployment. At 500A, there is shown a user interface of an application (e.g., such as a multimedia web-based application) for playing an audio or video file. The user interface includes image 502, stop button 504, play button 506, and fast forward button 508. A new feature of reverse playback is deployed, causing the user interface to then look like user interface 500B. The user interface 500B includes the features of user interface 500A with the addition of reverse playback button 518. To deploy the feature, the MSDB 202 checks for the existence of prerequisite features needed to support the reverse playback feature. This could include network features, encoding features, encryption features, or any other features needed to support the reverse playback feature. Additionally, environment factors may also be checked. This may include operating system versions and/or hardware requirements such as memory, available storage, and/or other environmental parameters.

FIG. 6 shows an example warning message 600 indicating a partial deployment. The message could be in the form of an email, SMS message, MMS message, intra-application message, instant message, etc. The message may be initiated by the MSDB 202, and sent to, for example, the software engineer. In the example, one of the features "dropbear 2015.68" was not able to be deployed. This is indicated at 602. The other features were deployed as the result was a "partial deployment." Thus, embodiments include issuing a notification indicating a partial deployment.

FIG. 7 shows an example error message 700 indicating a failed deployment. The message could be in the form of an email, SMS message, MMS message, intra-application message, instant message, etc. The message may be initiated by the MSDB 202, sent to, for example, the software engineer. In the example, the deployment failed because the required operating system was not available. This is indicated at 702. Thus, embodiments include issuing a notification indicating a failed deployment.

Instead of, or in addition to, initiating a message to a user, the MSDB 202 may issue a notification in a machine readable format to another server upon detecting a failed deployment or a partial deployment. For example, the MSDB 202 may issue an indication in a JSON format to another server, such as cross-team continuous integration server 232, or another server. In some cases, the message in a machine readable format can trigger an action that is automatically carried out on the deployed system, such as implementing a failover, reverting to previous versions of components, or other suitable action.

FIG. 8 shows an example services JSON file 800. The name of the service is "service A". Service A has Feature A and Feature B. The service requires Feature C. Thus, when attempting to deploy service A, the MSDB 202 will first confirm that the appropriate component (micro-service) is currently providing feature C.

FIG. 9 shows an example environment JSON file 900. The environment JSON file can specify environment requirements for the feature that is to be deployed. The environment requirements can include, but are not limited to, IP addresses, exposed ports, and/or containers.

As can now be appreciated, disclosed embodiments provide techniques that greatly simplify the deployment of new features in a micro-service environment. A micro-service deployment broker receives deployment requests, analyzes dependencies, and provides appropriate instructions to a cross-team continuous integration server to carry out the deployment in an optimal manner. In this way, the complexities of analyzing multiple requirements provided by multiple components is handled in an automated procedure, providing for reduced downtime and improved customer satisfaction and user experiences with services provided by a micro-service environment.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for managing microservice deployment in a computing environment, comprising:
   receiving a deployment request;
   performing an environment query of the computing environment;
   performing a feature query of the computing environment;
   identifying required features for the deployment request;
   identifying a required environment for the deployment request; and
   generating a deployment command based on the environment query, the feature query, the identified required features, and the identified required environment.

2. The method of claim 1, wherein the deployment command includes a full simultaneous deployment command.

3. The method of claim 1, wherein the deployment command includes a full sequential deployment command.

4. The method of claim 1, wherein the deployment command includes a partial deployment command.

5. The method of claim 1, wherein the deployment command includes a failed deployment command.

6. The method of claim 4, further comprising issuing a notification indicating a partial deployment.

7. The method of claim 5, further comprising issuing a notification indicating a failed deployment.

8. An electronic device comprising:
   a processor; and
   a memory coupled to the processor, the memory containing instructions, that when executed by the processor, perform the steps of:
   receiving a deployment request;
   performing an environment query of the computing environment;
   performing a feature query of the computing environment;
   identifying required features for the deployment request;
   identifying a required environment for the deployment request; and
   generating a deployment command based on the environment query, the feature query, the identified required features, and the identified required environment.

9. The electronic device of claim 8, wherein the memory further contains instructions, that when executed by the processor, perform the step of issuing a full simultaneous deployment command.

10. The electronic device of claim 8, wherein the memory further contains instructions, that when executed by the processor, perform the step of issuing a full sequential deployment command.

11. The electronic device of claim 8, wherein the memory further contains instructions, that when executed by the processor, perform the step of issuing a partial deployment command.

12. The electronic device of claim 8, wherein the memory further contains instructions, that when executed by the processor, perform the step of issuing a failed deployment command.

13. The electronic device of claim 11, wherein the memory further contains instructions, that when executed by the processor, perform the step of issuing a notification indicating a partial deployment.

14. The electronic device of claim 8, wherein the memory further contains instructions, that when executed by the processor, perform the step of issuing a notification indicating a failed deployment.

15. The electronic device of claim 8, wherein the memory further contains instructions, that when executed by the processor, perform the step of accessing query credentials from a connected database.

16. A computer program product for managing microservice deployment in a computing environment, the computer program product configured to execute on an electronic computing device, the electronic computing device comprising a computer readable storage medium having program instructions embodied therewith, the program instructions executable by a processor to cause the electronic computing device to:
   receive a deployment request;
   perform an environment query of the computing environment;
   perform a feature query of the computing environment;
   identify required features for the deployment request;
   identify a required environment for the deployment request; and
   generate a deployment command based on the environment query, the feature query, the identified required features, and the identified required environment.

17. The computer program product of claim 16, further comprising program instructions executable by the processor to cause the electronic computing device to issue a full simultaneous deployment command.

18. The computer program product of claim 16, further comprising program instructions executable by the processor to cause the electronic computing device to issue a full sequential deployment command.

19. The computer program product of claim 16, further comprising program instructions executable by the processor to cause the electronic computing device to issue a partial deployment command.

20. The computer program product of claim 16, further comprising program instructions executable by the processor to cause the electronic computing device to issue a failed deployment command.

* * * * *